United States Patent [19]
Merrick

[11] Patent Number: 6,065,777
[45] Date of Patent: May 23, 2000

[54] CLAMP FOR RETRACTOR BELT

[75] Inventor: David D. Merrick, Cicero, Ind.

[73] Assignee: Indiana Mills & Manufacturing, Inc., Westfield, Ind.

[21] Appl. No.: 08/964,974

[22] Filed: Nov. 5, 1997

[51] Int. Cl.[7] .................................................. B60R 22/06
[52] U.S. Cl. ....................... 280/804; 280/801.1; 280/807; 280/808
[58] Field of Search ................................ 280/804, 801.1, 280/807, 808; 297/464, 468, 473, 474, 476, 479, 481, 483, 485, 486

[56] References Cited

U.S. PATENT DOCUMENTS

| | | | |
|---|---|---|---|
| 4,726,625 | 2/1988 | Bougher | 297/483 |
| 5,015,010 | 5/1991 | Homeier et al. | 280/808 |
| 5,054,815 | 10/1991 | Gavagan | 280/808 |
| 5,058,244 | 10/1991 | Fernandez | 24/170 |
| 5,125,686 | 6/1992 | Yano et al. | 280/808 |
| 5,138,749 | 8/1992 | McCune et al. | 24/196 |
| 5,149,136 | 9/1992 | Maekawa et al. | 280/808 |
| 5,154,446 | 10/1992 | Blake | 280/808 |
| 5,269,050 | 12/1993 | Yewer, Jr. | 24/170 |
| 5,286,057 | 2/1994 | Forster | 280/808 |
| 5,350,195 | 9/1994 | Brown | 280/806 |
| 5,350,196 | 9/1994 | Atkins | 280/808 |
| 5,443,302 | 8/1995 | Dybro | 297/471 |
| 5,495,646 | 3/1996 | Scrutchfield et al. | 24/500 |
| 5,653,003 | 8/1997 | Freeman | 24/543 |
| 5,661,877 | 9/1997 | Bloomer | 24/170 |
| 5,669,253 | 9/1997 | Higgins | 70/18 |

*Primary Examiner*—Eric Culbreth
*Attorney, Agent, or Firm*—Woodard, Emhardt, Naughton Moriarty & McNett

[57] ABSTRACT

A clamp for adjusting the length of a seatbelt. The clamp is moveable along a track between first and second endstops. The clamp includes a slider coupled to the track and a housing that is slidable relative to the slider. Sliding the housing to the locked position results in the clamping of the seatbelt between a groove of the slider and the edge of a pivotal locking bar. The clamp is secured to the seatbelt at the first endstop. Subsequent movement by the passenger results in the clamp moving along the track. Upon reseating by the passenger, the clamp will be supported at a support position intermediate of the first and second endstops, resulting in increased slack in the shoulder portion of the seatbelt, reduced tension in the shoulder portion, and increased comfort for the passenger.

21 Claims, 5 Drawing Sheets

CLAMP FOR RETRACTOR BELT

BACKGROUND OF THE INVENTION

This invention relates generally to passenger restraint systems which include seatbelts, and more particularly to a system which includes a seatbelt retractor.

Seatbelt systems, such as those typically employed in passenger vehicles, include a retractor for collecting excess belting and providing tensioning for the system. With certain types of retractors, a degree of tension in the belt is imposed by the retractor. This tension will provide a tugging against the shoulder of the passenger which can be uncomfortable. There are various designs which have been proposed to reduce this tugging and chafing of the shoulder belt against the shoulder of the passenger. Some of these designs permit the passenger to select the amount of excess slack in the seatbelt.

Nevertheless, there is always a need for an alternate passenger restraint system to overcome the situation in which tension from a retractor is felt against the shoulder of the passenger. The present invention provides a novel and unobvious way to reduce tension in the shoulder portion.

SUMMARY OF THE INVENTION

The present invention provides for improved apparatus and methods for adjustably clamping a seat belt in a vehicle. One aspect of the present invention includes a track with two endstops, and a slider movable on the track between the endstops. The slider includes a locking bar, with the seat belt passing between a portion of the slider and the locking bar. There is also a housing slidable relative to the slider between a locked and an unlocked position, wherein sliding the housing to the locked position secures the seat belt between the portion of the slider and the locking bar, and sliding the housing to the unlocked position permits the seat belt to move freely between the portion of the slider and the locking bar.

This and other objects and advantages of the present invention will be apparent from the drawings, Description of the Preferred Embodiment, and the claims to follow.

DESCRIPTION OF THE PREFERRED EMBODIMENT

Figure 1:
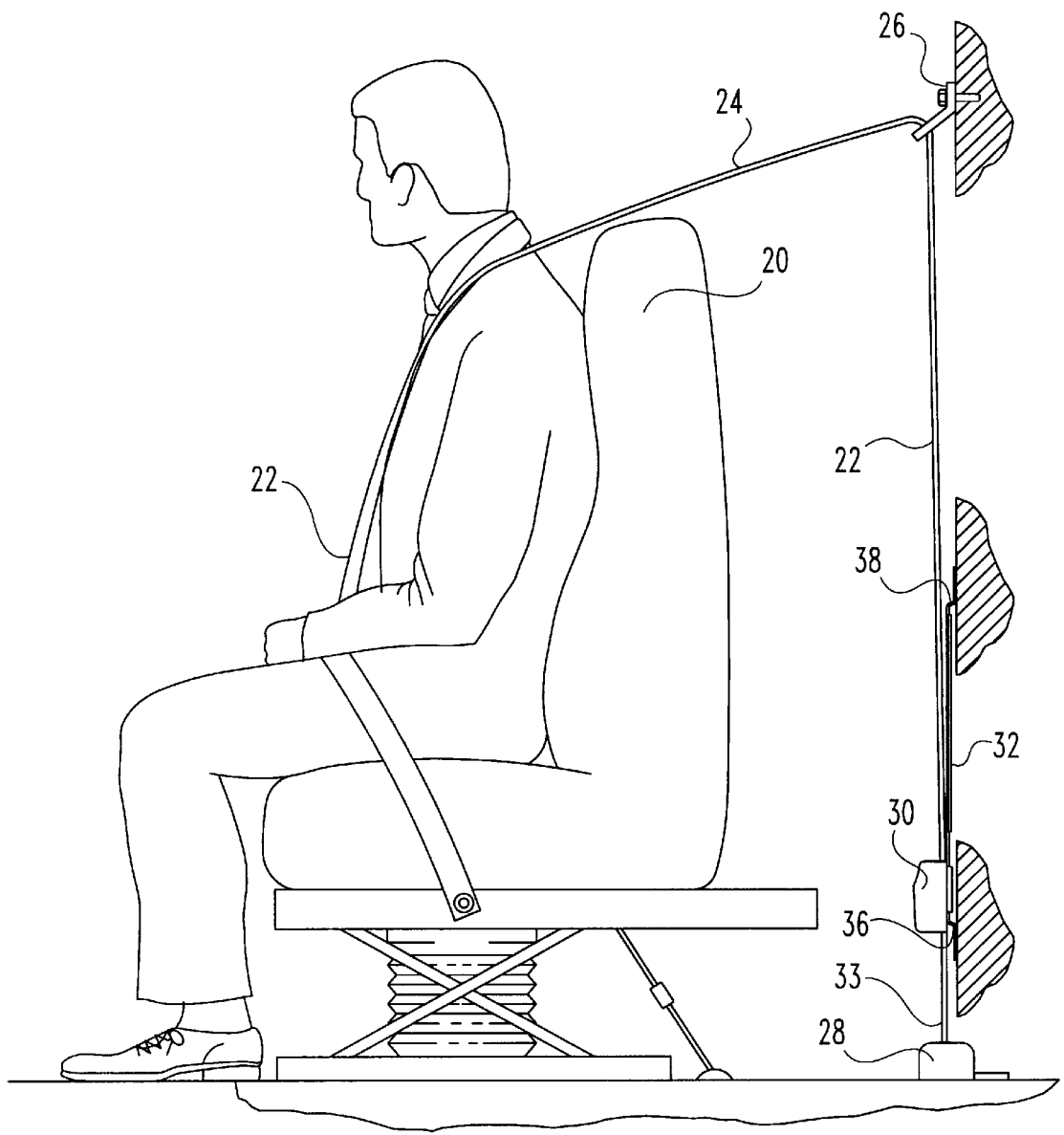
FIG. 1 shows one embodiment of the present invention as used within a vehicle.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 shows one embodiment of the present invention as used within a vehicle. A passenger is shown secured to a seat 20 by a three point seatbelt 22. Seatbelt 22 includes a shoulder portion 24 that rides over the shoulder of the passenger and passes through a support 26 which is anchored to the structure of the vehicle. Support 26 permits shoulder portion 24 to pass freely through. One example of support 26 is a D-loop, although there are other types of supports known to those of ordinary skill in the art.

Seatbelt 22 may be pulled from a retractor 28 which is anchored to the structure of the vehicle. One end of seatbelt 22 is attached to a spring biased spool rotatably mounted within retractor 28 whereas the opposite end of seatbelt 22 is anchored to the frame of the seat. A conventional tongue is slidably mounted between the ends of the seatbelt and is releaseably lockable, in the conventional manner, with a buckle also anchored to the seatbelt frame when shoulder portion 24 is pulled across the chest of the occupant.

Retractor 28 provides a length of belt to the passenger when seatbelt 22 is buckled, or after buckling when the passenger moves. During a rapid deceleration of the vehicle, retractor 28 locks seatbelt 22 from further extension such that the passenger is held securely in seat 20. Retractor 28 may be of the inertia reel type, an electronically controlled type, or other types known to those of ordinary skill in the art. During non-emergency operation, retractor 28 places tension in belt 22 in the direction of retracting seatbelt 22 to within retractor 28.

Located between retractor 28 and support 26 is clamp assembly 30 which is moveable along track 32. Track 32 is secured to a portion of the vehicle. Although support 26, retractor 28, clamp 30, and track 32 are shown behind seat 20, and in front of the rear vehicle compartment wall, they also may be located to a side of seat 20, or along the B-pillar of the vehicle. Likewise, retractor 28 may be concealed or behind the rear compartment wall with seatbelt 22 extending through a slot in the compartment rear wall to the clamp assembly 30 mounted in front of the wall. Likewise, clamp 30 may be mounted adjacent support 26.

Figure 2:
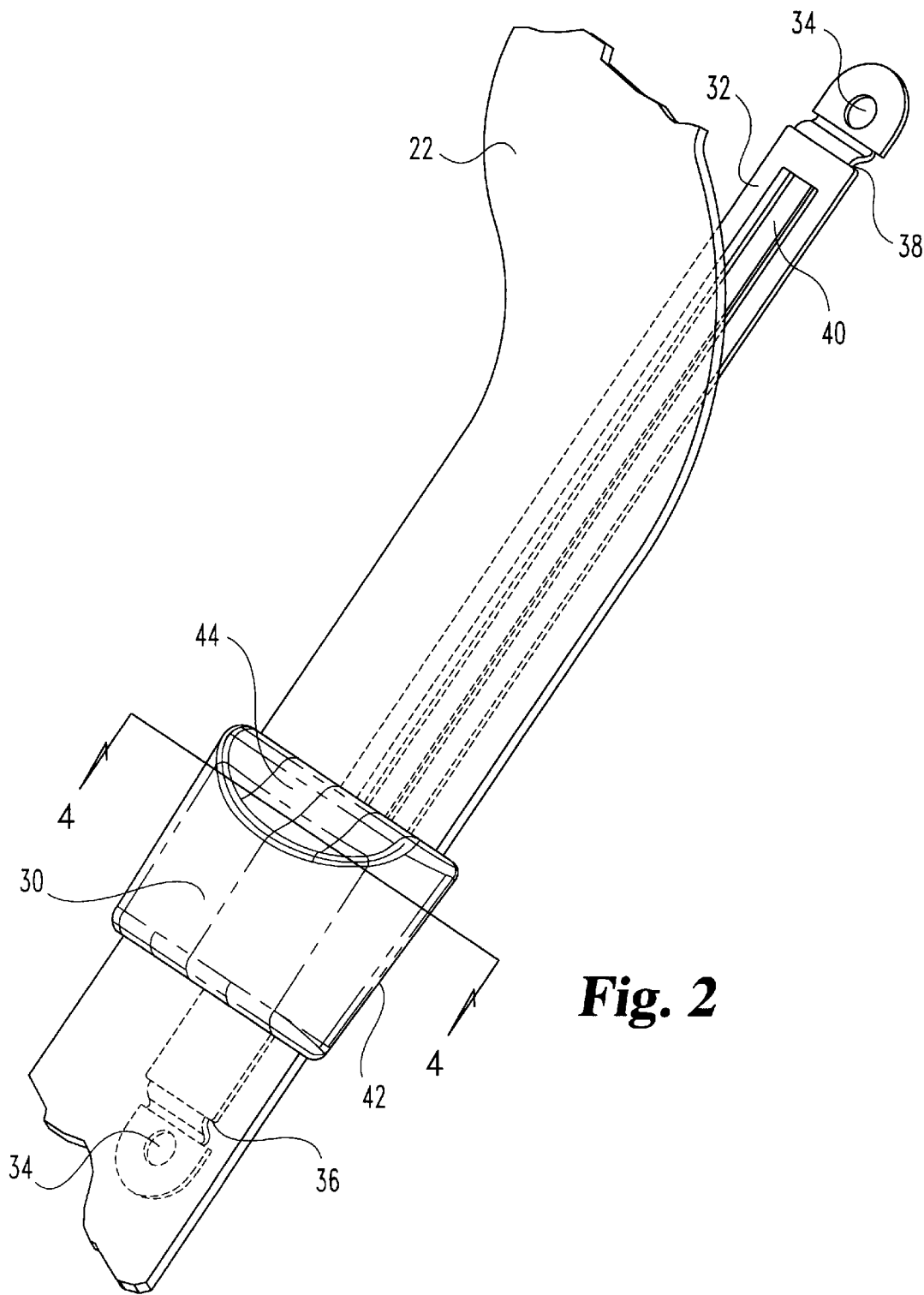
FIG. 2 is a perspective view of the clamp, track, and belt of FIG. 1.

FIG. 2 is a perspective view of the clamp, track, and belt of FIG. 1. Seatbelt 22 passes through clamp 30. Track 32 is retained to the vehicle by fasteners (not shown) that act through fastener holes 34. Clamp 30 is moveable along track 32 from a first endstop 36 to a second endstop 38. Endstops 36 and 38 are angled portions of track 32. Clamp 30 in FIG. 2 is shown placed at a support position 42.

Figure 3:
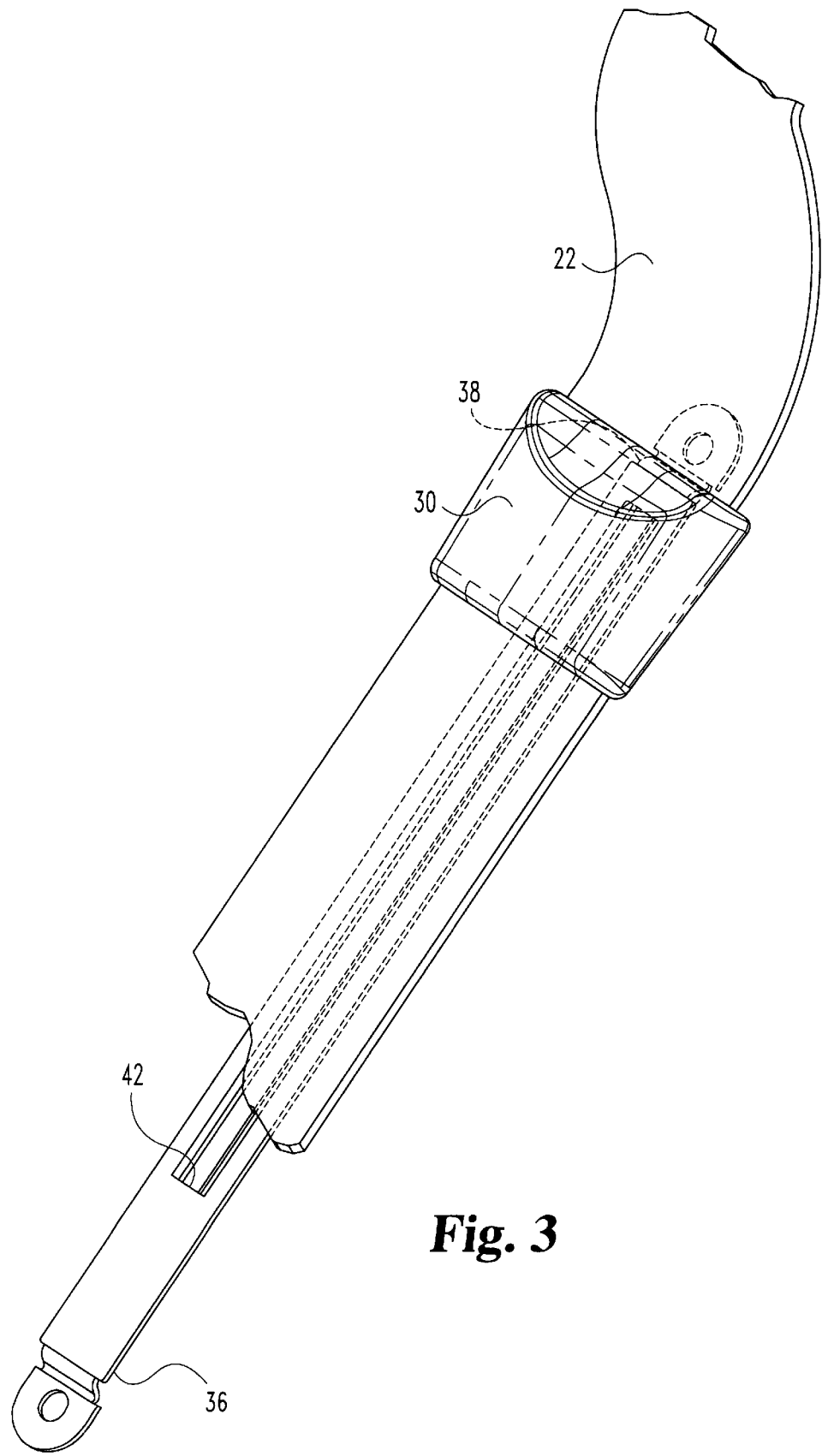
FIG. 3 is a perspective view of the clamp, track, and belt of FIG. 1 with the clamp moved to the second endstop.

FIG. 3 shows clamp 30 at second endstop 38. Track 32 includes a groove 40 (FIG. 2) that extends generally from second endstop 38 to a support position 42. Support position 42 is spaced apart from first endstop 36. Clamp 30 includes a rounded depression 44 to permit a person's hand to easily push clamp 30 toward first endstop 36.

Figure 4:
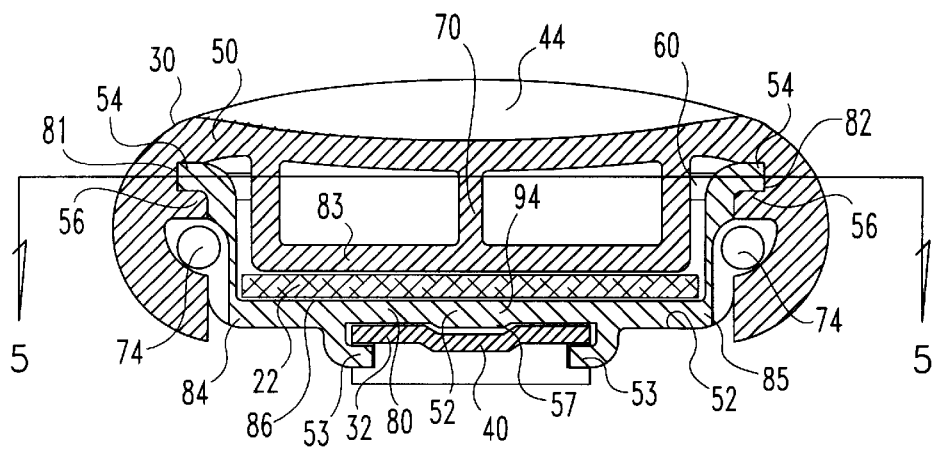
FIG. 4 is a view of the apparatus of FIG. 2 as taken along line 4—4 of FIG. 2.

FIG. 4 is a view of the apparatus of FIG. 2 as taken along line 4—4 of FIG. 2. Clamp 30 comprises a housing 50 and a slider 52. Slider 52 is slidably coupled to and moveable along track 32. Slider 52 includes two pairs of fingers 53 integrally attached to the main body 80 of the slider and having distal ends spaced apart from the main body forming a slot containing track 32. Fingers 53 wrap around the edges of track 32. Housing 50 is slidable relative to slider 52. A pair of lips 54 integrally attached to main body 80 of slider 52 extend outwardly in opposite directions into mutually facing recesses 81 and 82 formed in the opposite edges 56 of housing 50. Wall 83 of housing 50 is spaced apart from wall portions 84 and 85 of slider main body 80 forming a slot 86 through which seatbelt 22 is moveable.

Main body 80 of slider 52 also incorporates a center bump 57. Center bump 57 has a shape that fits with clearance within groove 40 of track 32. However, center bump 57 provides increased resistance to movement of slider 52 along track 32 between support position 42 and endstop 36. Bump 57 provides a slight interference fit between slider 52 and the grooveless portion of track 32. Although the preferred embodiment includes a generally flat track 32 with a groove 40 therein, the present invention also contemplates other methods of guiding clamp 30 along a predetermined path such as, by way of example only, a groove within the structure of the vehicle or one or more rails mounted to the vehicle. In addition, such alternative tracks could incorporate alternative methods of providing increased resistance to movement of clamp 30 at a support position.

Figure 5:
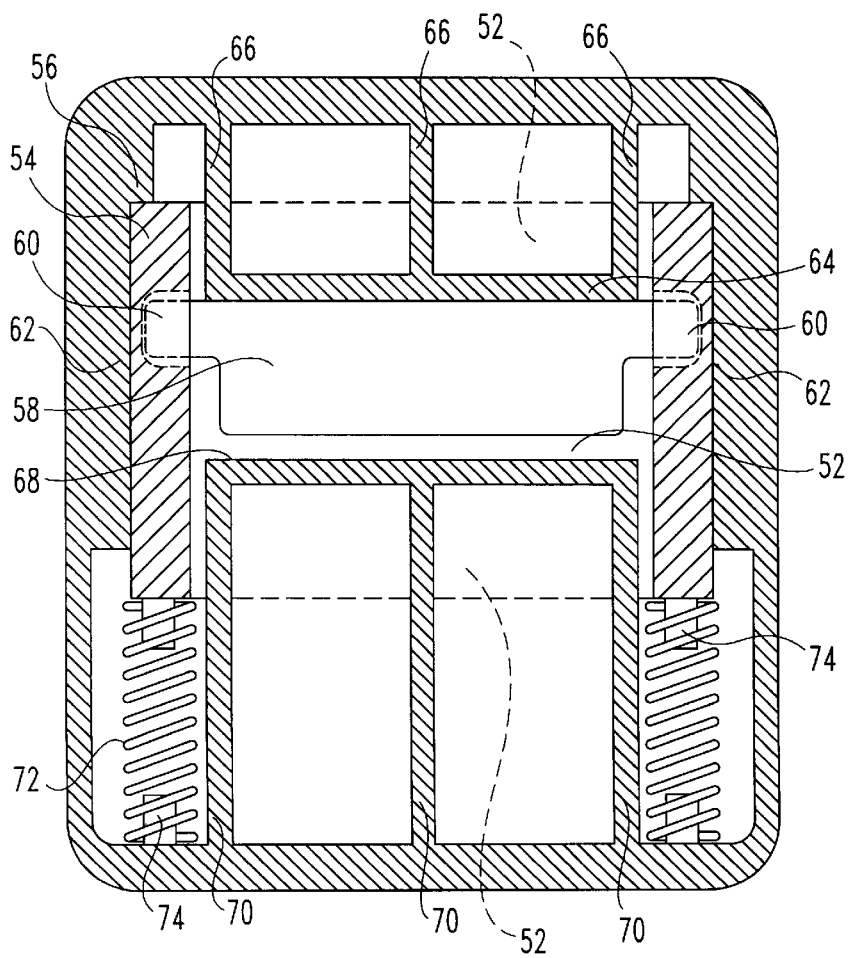
FIG. 5 is a view of the clamp of FIG. 2 as taken along line 5—5 of FIG. 4.

FIG. 5 is a view of the clamp of FIG. 2 as taken along line 5—5 of FIG. 4. Clamp 30 also includes within it a locking bar 58. Locking bar 58 includes a pair of cylindrical pivots 60 that are pivotally mounted within holes 62 within slider 52. Locking bar 58 is shown in FIG. 5 in contact with unlocking rest 64 of housing 50. Internal webs 66 support unlocking rest 64. Generally opposing unlocking rest 64 and located on the other side of locking bar 58 is locking rest 68. Locking rest 68 is supported in housing 50 by internal webs 70. A pair of springs 72 urge housing 50 relative to slider 52 so as to position locking bar 58 in contact with unlocking rest 64. A pair of pins 74 position each spring 72.

Figure 6:
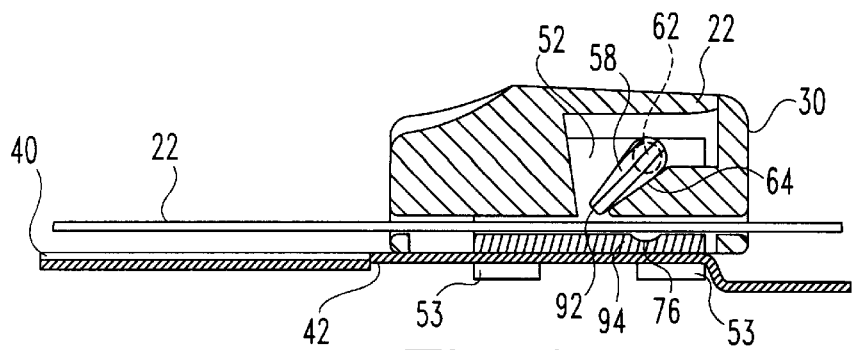
FIG. 6 shows a centered cross section of the clamp and track of FIG. 2 with the slider in contact with the first endstop.
Figure 7:
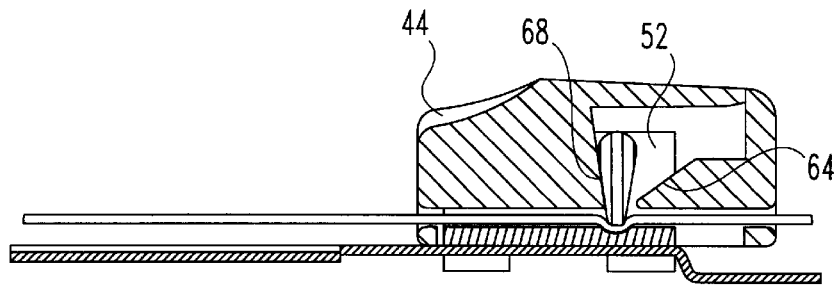
FIG. 7 shows the clamp and track of FIG. 6 with the clamp pushed against the first endstop.
Figure 8:
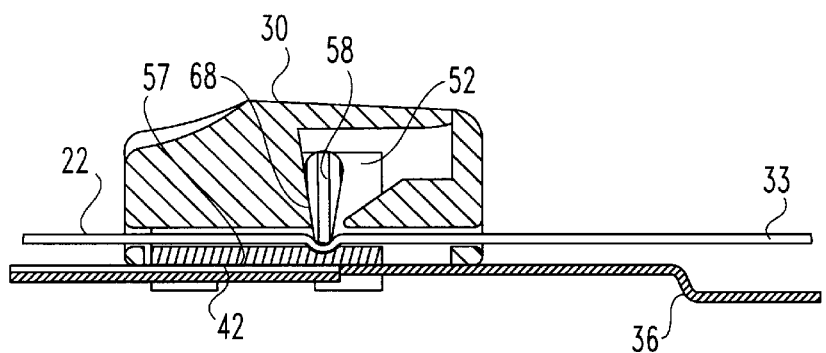
FIG. 8 shows the clamp and track of FIG. 6 with the clamp supported at a support position.

Operation of clamp 30 is shown in FIGS. 6, 7, and 8. The present invention provides an apparatus and methods for providing a predetermined amount of slack in the shoulder portion of a seatbelt securing a passenger to a seat in a vehicle. In order to provide the predetermined amount of slack, the present invention must be knowingly engaged by the passenger. After the passenger has fastened the tongue of seatbelt 22 into a buckle (not shown), the passenger pushes upon depression 44 of housing 50 and slides clamp 30 past support position 42 until slider 52 comes into contact with first endstop 36.

FIG. 6 shows the clamp and track of the present invention with the slider in contact with the first endstop. In FIG. 6, the passenger has moved clamp 30 past support position 42 and placed slider 52 in contact with first endstop 36 but has not fully pushed clamp 30 against first endstop 36. The bias of springs 72 has not been overcome by the passenger and slider 52 and housing 50 remain spaced apart such that locking bar 58 is in the unlocked position against unlocking rest 64. In FIG. 6, seatbelt 22 is free to slide within clamp 30.

FIG. 7 shows the clamp and track of the present invention with the clamp pushed to a locking position against the first endstop. In FIG. 7, the passenger has completed pushing clamp 30 against first endstop 36 with sufficient force to overcome the force of springs 72 and to slide housing 50 into the locked position relative to slider 52. As housing 50 is slid relative to slider 52 locking bar 58 moves out of contact with unlocking rest 64. Continued sliding of housing 50 relative to slider 52 results in locking rest 68 coming into contact with locking bar 58. Locking rest 68 has an angled face in contact with locking bar 58 that places locking bar 58 generally perpendicular to the portion of slider platform 94 opposite of holes 62. The slider platform 94 is integrally attached to and extends between portions 84 and 85 (FIG. 4) of the main body 80 of the slider. In the preferred embodiment there is a locking groove 76 in this portion of slider platform 94. As pressure is applied by the passenger on clamp 30, locking rest 68 places edge 92 of locking bar 58 into locking groove 76 such that belt 22 is clamped between edge 92 and locking groove 76. This action secures clamp 30 to seatbelt 22. Holes 62 for pivoting of locking bar 58 are generally opposite of locking groove 76 of platform 94.

As shown in FIG. 7, clamp 30 is secured to seatbelt 22, and as the passenger removes his hand from clamp 30, housing 50 will remain in the locked position relative to slider 52. If the passenger should move forward, for example in reaching something relatively close, the shoulder of she passenger will pull seatbelt 22 with clamp 30 secured to it along track 32 to a maximum location of second endstop 38. When the passenger returns to his normally seated position retractor 28 applies tension to portion 33 (FIG. 1) of belt 22 between retractor 28 and clamp 30. This tension is sufficient to move clamp 30 over that portion of track 32 that includes groove 40, clamp 30 moving freely over groove 40.

However, tension in portion 33 of seatbelt 22 is insufficient to pull clamp 30 past support position 42. As clamp 30 reaches support position 42, tension in portion 33 is insufficient to overcome the increased friction of bump 57 with support position 42. Therefore, clamp 30 remains at support position 42, as shown in FIG. 8, which is spaced apart a short, predetermined distance from first endstop 36. Thus, there is an increase in the length of seatbelt 22 around the passenger by the predetermined amount, and there is increased slack in shoulder portion 24 of seatbelt 22 which results in shoulder portion 24 being more comfortable to the passenger. The predetermined increase in length of seatbelt 22 is equal to the distance from first endstop 36 to support position 42. Tension in belt portion 33 is reacted by the friction of bump 57 with support position 42. Thus, the present invention eliminates tension from the retractor into shoulder portion 24.

The present invention permits the passenger to freely move within the vehicle within the limit set by second endstop 38. After moving within this limit and then returning to a seated position, the passenger will not experience tension in shoulder portion 24 of seatbelt 22 because of the support of clamp 30 by support position 42. However, clamp 30 will release the securement of belt 22 between edge 92 and groove 76 if the passenger moves sufficiently far. For example, if the passenger reaches to the other side of the vehicle, then seatbelt 22 will pull clamp 30 against second endstop 38. As slider 52 of clamp 30 comes into contact with second endstop 38, the tension in belt 22 from the movement of the passenger will pull edge 92 out of locking groove 76. Springs 72 will urge housing 50 to become spaced apart to the unlocking position relative to slider 52. Locking bar 58 comes into contact with unlocking rest 64. For the vertical orientation of track 32 shown in FIG. 1, the unlocked clamp 30 slides freely over track 32 back to support position 42. Clamp 30 is no longer secured to seatbelt 22 and tension loads from retractor 28 are no longer reacted within track 32, but are instead felt against the shoulder of the passenger. The passenger may reset clamp 30 to the locked position by repeating the steps described above. During emergency operation the present invention does not interfere with the normal operation of seatbelt 22 or retractor 28.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A passenger restraint system for a vehicle, comprising:
a passenger seat;
a seat belt for securing a passenger within said seat;
a retractor for retracting said seat belt and capable of holding said seat belt during deceleration of the vehicle;
a track with first and second endstops; and
a clamp movable on said track between said first endstop and said second endstop, said clamp capable of releaseably clamping said seat belt;
wherein moving said clamp to the first endstop secures said clamp to said seat belt, and pulling said seat belt from said clamp releases said seat belt.

2. The system of claim 1 wherein said clamp includes a locking bar and a locking groove, said seat belt passing between said locking bar and said locking groove.

3. The system of claim 1 wherein said track includes a support position intermediate of the first endstop and the second endstop, and moving said clamp from the first endstop to the support position increases the length of belt around the passenger by a predetermined amount.

4. A restraint system for a passenger in a vehicle, comprising:
a passenger seat;
a seat belt for securing the passenger within said seat;
a retractor for retracting said seat belt and capable of holding said seat belt during deceleration of the vehicle;
a track with a first stop and a stop and a support position; and
a clamp movable on said track between the first stop and the support position, said clamp capable of releasebly clamping said seat belt;
wherein pushing said clamp to the first stop secures said clamp to said seat belt, and moving said clamp from the first stop to the support position increases the length of seat belt around the passenger by a predetermined amount.

5. The system of claim 4 wherein said clamp includes a locking bar for securing said seat belt to said clamp.

6. The system of claim 4 wherein said track includes a second stop, the support position being intermediate of the first stop and the second stop, and pulling said seat belt from said clamp against said second stop releases said seat belt from said clamp.

7. An apparatus for releaseably clamping a seat belt, comprising:
a track with two endstops;
a slider movable on said track between endstops, said slider including a locking groove and a locking bar, said locking bar having an edge locatable proximate to said locking groove, the seat belt passing between said locking groove and the edge; and
a housing slidable relative to said slider to a locked position;
wherein sliding said housing to the locked position clamps the belt between said locking groove and the edge.

8. The apparatus of claim 7 wherein said track includes a support position intermediate of the endstops and capable of supporting said slider.

9. The apparatus of claim 7 wherein sliding said housing to one of said endstops unclamps the belt from between said locking groove and the edge.

10. An apparatus for releaseably clamping a seat belt, comprising:
a track with two endstops;
a slider having a portion and movable on said track between the endstops, said slider including a locking bar pivotally mounted thereto and having a locked position, said locking bar having an edge, the seat belt passing between the portion of said slider and the edge; and
a housing slidable relative to said slider;
wherein sliding said housing pivots said locking bar to the locked position and secures the seat belt to the slider.

11. The apparatus of claim 10 wherein said track includes a support position intermediate of the endstops and capable of supporting said slider.

12. The apparatus of claim 10 wherein pulling said housing to one of said endstops unclamps the belt from the slider.

13. An apparatus for releaseably clamping a seat belt, comprising:
a track with two endstops and a support position below one of the endstops;
a slider freely movable on said track between the support position and the one endstop, said slider being securable to the seat belt;
a housing slidable relative to said slider to a locked position; and
wherein sliding said housing to the locked position secures said slider to the seat belt, said secured slider and seat belt capable of being supported at the support position.

14. The apparatus of claim 13 wherein pulling said housing in the locked position to the one endstop unclamps said slider from the seat belt.

15. The apparatus of claim 13 wherein pushing said housing to the other endstop secures said slider to the seat belt.

16. A method for releaseably clamping a seat belt, comprising:
providing a retractor, clamp, and track, said track having a first stop and a support position;
applying tension in the seat belt by the retractor;
locking the seat belt to the clamp at the first stop;
moving the clamp and seat belt to a support position along the track; and
supporting the clamp and seat belt such that the tension in the belt from the retractor is reacted at the support position.

17. The method of claim 16 wherein said track includes a second stop, the support position being intermediate of the first stop and the second stop, and which further comprises unlocking the clam from the seat belt by pulling the seat belt to the second stop.

18. The method of claim 16 which further comprises permitting the locked seat belt to freely slide from the support position to a second stop along the track.

19. A method for releaseably clamping a seat belt, comprising:
providing a seat belt with a retractor;

locking a seat belt to a clamp at a first stop along a track, the clamp being slidable along the track from the first stop to a second stop;

sliding the clamp and seat belt to a support position along the track between the first and second stops such that the length of belt between the clamp and retractor increases; and permitting the locked seat belt to freely slide to a second stop along the track.

20. The method of claim 19 which further comprises supporting the clamp and seat belt at a support position along the track.

21. The method of claim 19 which further comprises applying tension in the seat belt by the retractor and reacting the tension in the seat belt at a support position along the track.

* * * * *

UNITED STATES PATENT AND TRADEMARK OFFICE
CERTIFICATE OF CORRECTION

PATENT NO.   : 6,065,777  
DATED        : May 23, 2000  
INVENTOR(S)  : David D. Merrick Page 1 of 1

It is certified that error appears in the above-identified patent and that said Letters Patent is hereby corrected as shown below:

<u>Column 5,</u>
Line 35, please delete "and a stop".

<u>Column 6,</u>
Line 58, please change "clam" to -- clamp --.

Signed and Sealed this

Fifteenth Day of January, 2002

*Attest:*

*Attesting Officer*

JAMES E. ROGAN
*Director of the United States Patent and Trademark Office*